June 11, 1968

H. GLANTZ 3,387,584

SIGNAL FOR AUTOMOBILES

Filed Sept. 16, 1966

INVENTOR.
HERSHEY GLANTZ
BY

United States Patent Office 3,387,584
Patented June 11, 1968

3,387,584
SIGNAL FOR AUTOMOBILES
Hershey Glantz, 1401 SW. 17 Terrace,
Miami, Fla. 33145
Filed Sept. 16, 1966, Ser. No. 579,865
3 Claims. (Cl. 116—28)

ABSTRACT OF THE DISCLOSURE

A flag-like identification structure supported on the upper end of a vertical staff member which is resiliently clamped to the gutter of an automobile.

This invention relates to automobile processions, parades and parking signals and more particularly to an automobile identification means.

The identification of automobiles in a procession or parade and individually in parking lots has always presented a problem.

Prior devices, such as flags equipped with clamps for fastening to the automobile, often marred the surface thereof and were subject to dislocation from jarring or from the wind.

The present invention overcomes the above objections and disadvantages by the provision of a flagstaff having numeral bearing flags visible from any direction with a base means for attachment to the gutter of an automobile with spring means with a scissor like action for holding the staff firmly in position.

Another object of the invention is the provision of a base means having a scissor like lever system for engaging the gutter of an automobile top with the body covered with an elastomer for preventing marring of the automobile finish.

A further object of the invention is the provision of a flagstaff and brackets therefor for engagement with a conventional radio antenna of the automobile.

These and other objects and advantages in one embodiment of the invention are described and shown in the following specification and drawing, in which.

Figure 3:
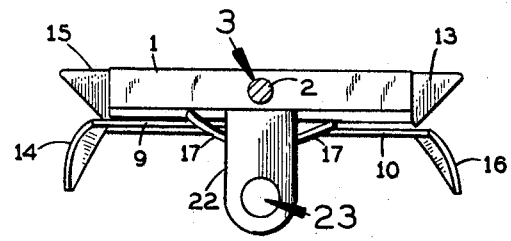
FIG. 3 is a cross sectional plan view taken through section line 3—3, FIG. 2.
Figure 4:
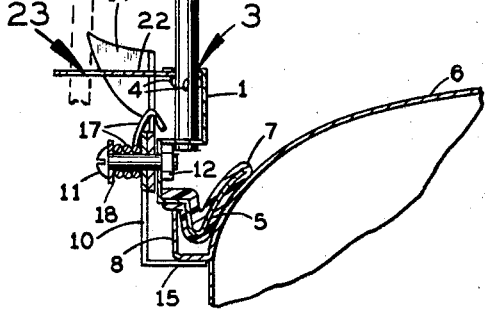
FIG. 4 is a cross sectional end elevation taken through section line 4—4, FIG. 2.

A base member 1 having a uniform cross sectional configuration supports the flagstaff 2 which projects through holes 3—3, shown in FIGS. 3 and 4, in the horizontal portions of the base member and are retained therein by a plurality of deformations 4 in the staff.

The lower portion 5 of the base member 1 is shaped to conform with the outer margin of an automobile top 6 and is coated with an elastomer material 7 to prevent marring the surface of the top or the inner surface of gutter 8, as shown in FIG. 4.

Figure 2:
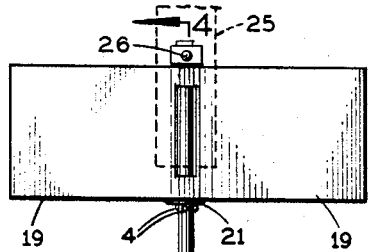
FIG. 2 is a side elevation of the signal, shown in FIG. 1, in larger scale.
Figure 5:
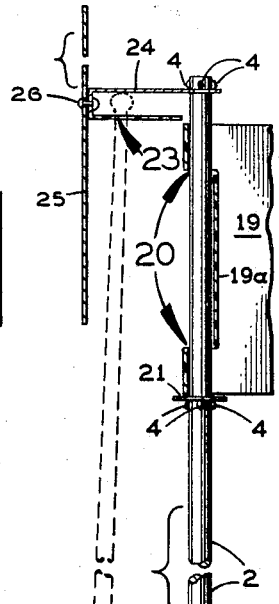
FIG. 5 is a fragmentary side elevation of elements shown in FIG. 2 in changed position.
Figure 5:
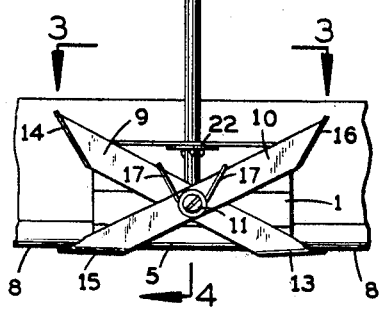

Referring to FIGS. 2 and 4, a pair of levers 9 and 10 are pivoted for oscillation about a screw 11 which is retained on a vertical portion of base member 1 by a nut 12. Lever 9 has an inward formed foot 13 for engaging the underside of gutter 8 and an outward formed handle 14. Lever 10 has an inward formed foot 15 for engaging the underside of gutter 8 and an outward formed handle 16, as shown in FIG. 2.

A torsion spring 17 positioned under a washer 18 around screw 11 terminates at opposite ends in hooks which are engaged with the upper edges of levers 9 and 10, best shown in FIGS. 2 and 4, for urging lever 10 in a clockwise direction and urging lever 9 in a counterclockwise direction.

A substantially rigid dual flag 19 of right angle shape is pivoted on staff 2 by means of a formed offset 19a therein at the junction of the two planes of the flag, forming the two holes 20 for retaining the flag on staff 2 for rotation, as shown. A washer 21 resting on another plurality of deformations 4 supports the flag on the staff, as shown.

A lower auxiliary flat bracket 22 is retained between base member 1 and the deformations 4 and projects outward from the staff with a hole 23 therethrough, the use of which will be hereinafter described.

An upper auxiliary bracket 24 is retained to the staff by a third plurality of deformations 4 in the latter and a portion of the bracket having a hole therethrough is folded under and positioned within the angle formed by the flag 19, the use of which will be hereinafter described.

Figure 1:
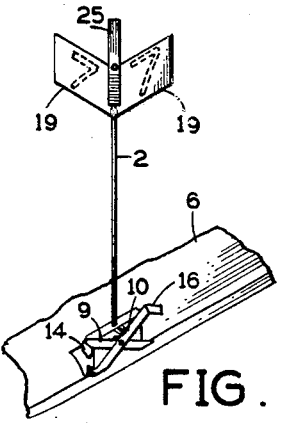
FIG. 1 is a perspective view in reduced scale of a signal attached to a fragmentary portion of a vehicle top.

Referring to FIGS. 1 and 4, a semaphore signal is centrally and frictionally pivoted by a rivet 26 to the outer end of bracket 24 and the semaphore has its opposite ends finished in different colors for identification purposes.

In operation, the signal device is secured to the gutter of an automobile by gripping the handles 14 and 16 in scissor fashion and engaging the lower portion of the base member in the gutter with a side portion resting against the outer marginal surface of the top, and releasing the handles 14 and 16, which will permit a spring 17 to engage the feet 13 and 15 against the underside of the gutter, thus clamping the base member to the gutter and holding the staff 2 in substantially vertical position.

The inside and outside surfaces of the flag 19 bear like predetermined numbers for visibility in all directions. A typical use for the semaphore relates to automobiles in a service parking area. When one predetermined end of the semaphore is turned uppermost, the car requires service, and when the opposite end of the semaphore is turned upright this indicates that the service is completed.

In the event an automobile having no gutters requires a flag, the holes 23 in the brackets 22 and 24 permit the flag to be dropped over and be supported on the upper end of a conventional radio antenna.

It is understood that certain modifications in the above construction, utilizing the features described, are intended to come within the scope of the appended claims.

Having described my invention, I claim:

1. A signal means for an automobile comprising a base member having a uniform cross sectional configuration, said member having a vertically extending upper portion and a lower portion said lower portion of said member being shaped to engage the inside surface of the gutter of said automobile and to rest against the outer surface of the top of said automobile adjacent said gutter for positioning said member in a vertical relation, a flagstaff of predetermined length secured in said upper portion of said member, a pair of dual levers pivotally mounted in crossed relation on said member for oscillation about a common axis normal to said member said levers having inturned lower end portions formed to engage the underside of said gutter when the upper ends of said levers are moved in divergent directions, spring means biased between said member and said levers for normally urging said lower end portions of said levers into clamped engagement with said gutter, a flag means secured to the upper end of said staff.

2. The construction recited in claim 1 including an offset bracket means retained on the upper end of said staff, a dual semaphore signal member pivotally secured for high frictional rotation on said bracket means about an axis normal to said staff, a different identification means on each end of said signal member visible for identification when manually rotated to an upward position.

3. The construction recited in claim 1 including an offset bracket secured in said base member extending from said base member normal to said staff having an aperture in the outer end thereof, a second bracket means secured to the upper end of said staff and extending normal therefrom having an aperture in a lower portion thereof and a stop surface thereabove whereby the apertures in said brackets in engagement with a vertical automobile radio antenna will support said flagstaff when the engagement of the upper end of said antenna rests against said stop surface.

References Cited

UNITED STATES PATENTS

| | | | |
|---|---|---|---|
| 2,342,017 | 2/1944 | Shepherd | 116—173 |
| 2,680,588 | 6/1954 | Wright | 116—28 XR |
| 2,764,122 | 9/1956 | Irvin | 116—173 |
| 3,136,289 | 6/1964 | Johnson | 116—28 |

LOUIS J. CAPOZI, *Primary Examiner.*